D. Lasher,

Furnace-Grate Bar.

No. 2,573. Reissued Apr. 23, 1867.

Witnesses.
Lemuel W. Serrell.
Thos. Ge. Harold.

Inventor.
Daniel Lasher

N. PETERS, PHOTO-LITHOGRAPHER, WASHINGTON, D. C.

United States Patent Office.

LORENZO B. TUPPER, OF NEW YORK, N. Y., ASSIGNEE OF DANIEL LASHER.

*Letters Patent No.* 29,997, *dated September* 11, 1860; *reissue No.* 2,573, *dated April* 23, 1867.

IMPROVEMENT IN GRATE-BARS.

The Schedule referred to in these Letters Patent and making part of the same.

TO ALL WHOM IT MAY CONCERN:

Be it known that DANIEL LASHER, of Brooklyn, in the county of Kings, and State of New York, did invent, make, and apply to use, a certain new and useful Improvement in Grate-Bars for Furnaces; and the following is declared to be a full, clear, and exact description of the construction and operation of the same, reference being had to the annexed drawing, making part of this specification, wherein—

Similar marks of reference denote the same parts.

Grate-bars have usually been fitted to run longitudinally of the furnace, in order that the scraper used for drawing out or stirring the fire may pass over the same and not drop into the openings between the bars. These grate-bars do not allow as much air space as desired for almost all furnaces, and not only obstruct the draught, but are very heavy, and warp and twist under the heat. Grate-bars have also been made with a longitudinal bar, having separate cross-bars projecting above such bar; but with these a scraper could not be used for stirring the fire or drawing it out, because it would fall in between the cross-bars.

The nature of this invention consists in a furnace grate-bar, with a series of parallelogram openings running crosswise of the bar or support, whereby a much larger air space is obtained than in the ordinary grate-bars, and at the same time the surface is such that the scraper or stirrer will not catch therein, and the weight of the grate-bar is greatly reduced without lessening the strength.

Figure 3:
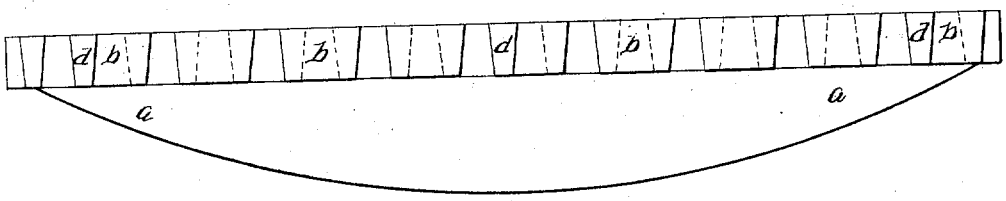
Figure 3 is a side elevation of the other.
Figure 2:
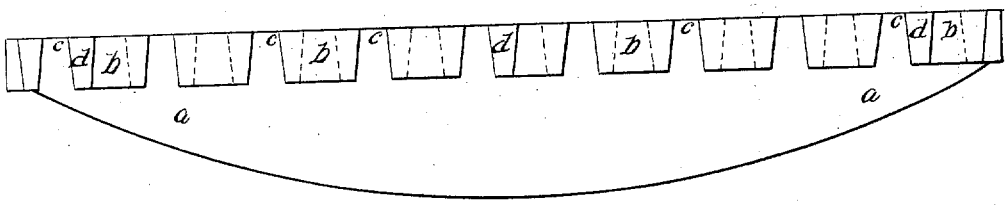
Figure 2 is a side elevation of one of said grate-bars.
Figure 1:
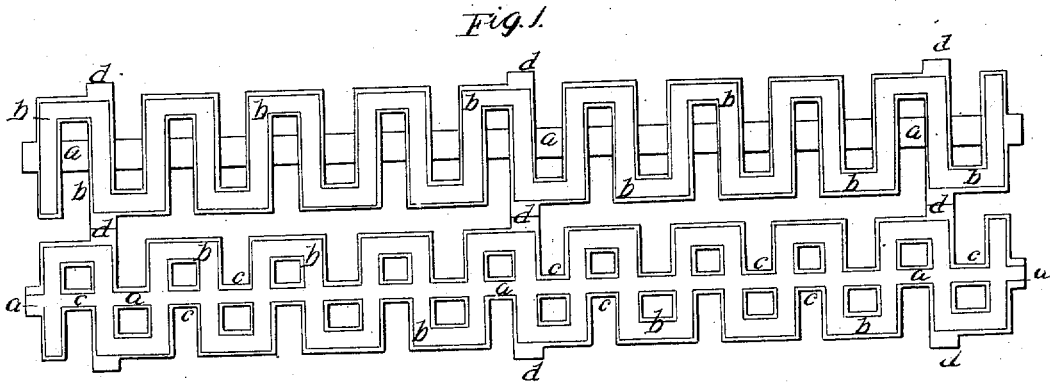
Figure 1 is a plan of two of the said grate-bars.

In the drawing, *a* is a metallic bar, supported by cross-bars at the ends, as now usual. *b b* is a series of parallelograms, running transversely of the bar *a*, the same being formed by bars across the bar *a*, connected at their ends. The alternate connection shown prevents injury by expansion and contraction. The bar *a* may stop at the under side of the cross-bars *b*, forming the parallelogram openings all across the bar, as seen in fig. 3, or the same may rise up to the same level as the cross-bars, as seen in fig. 2, and at *c c* in fig. 1. In this latter instance the parallelogram openings are shorter, and the grate-bar is rather heavier, and does not afford quite so much air space, but the surface of the bar *a* will also support the scraper. The bars are kept apart by lugs *d d* or interlocking projections, so that there are air spaces between the bars and the parallelogram openings transversely of the bar, and the grate-bar overhanging at its upper part, allows the bars *a a* to be much further apart than now usual, each of the bars being equal in width to two or three of those before used. The scraper slides freely over the surface produced by the grate-bars, because the length of transverse openings is less than the width of the scrapers or stirrers employed for this purpose, and the surface of the bar *a* and the connections between the ends of the cross-bars *b* support the same. The bars *a a* are kept as cold as possible, and hence are more durable, and the fire is freed from ashes more easily, because most of the openings are at right angles to the motion of the scrapers, and the longitudinal openings between the bars allow the fire to be raked from below.

What is claimed, and to be secured by Letters Patent, is—

1. A furnace grate-bar, having a series of parallelogram openings running crosswise of the bar, substantially as set forth.

2. A furnace grate-bar, in which the cross-bars are alternately connected at their ends, substantially as set forth, to strengthen said cross-bars and prevent the scraper dropping in between said bars, as set forth.

3. A furnace grate-bar, in which the surface of the longitudinal bar is on the same level as the top of the cross-bars, as set forth, so that said longitudinal bar will aid in supporting the scraper.

4. Furnace grate-bars, in which there are longitudinal air spaces between the bars, and parallelogram air spaces transversely of the bars, substantially as set forth.

Dated this twentieth day of March, A. D. 1867.

LORENZO B. TUPPER.

Witnesses:

GEORGE D. WALKER,

CHAS. H. SMITH.